(12) United States Patent
Kapich et al.

(10) Patent No.: US 11,961,099 B2
(45) Date of Patent: Apr. 16, 2024

(54) UTILIZING MACHINE LEARNING FOR OPTIMIZATION OF PLANNING AND VALUE REALIZATION FOR PRIVATE NETWORKS

(71) Applicant: Accenture Global Solutions Limited, Dublin (IE)

(72) Inventors: Kevin Edward Kapich, Broomfield, CO (US); Sean Delaney, Hoboken, NJ (US); Jorge Andres Gomez Fuentes, Austin, TX (US); Lina Christensen, Denver, CO (US); Tariq Salameh, Dubai (AE)

(73) Assignee: Accenture Global Solutions Limited, Dublin (IE)

( * ) Notice: Subject to any disclaimer, the term of this patent is extended or adjusted under 35 U.S.C. 154(b) by 152 days.

(21) Appl. No.: 17/249,820

(22) Filed: Mar. 15, 2021

(65) Prior Publication Data
US 2022/0292529 A1    Sep. 15, 2022

(51) Int. Cl.
*G06Q 30/0202*    (2023.01)
*G06N 5/04*    (2023.01)
(Continued)

(52) U.S. Cl.
CPC ........... *G06Q 30/0202* (2013.01); *G06N 5/04* (2013.01); *G06N 20/00* (2019.01); *H04L 41/145* (2013.01); *H04L 41/147* (2013.01)

(58) Field of Classification Search
None
See application file for complete search history.

(56) References Cited

U.S. PATENT DOCUMENTS 11,410,111 B1 *   8/2022   Washam ............... G06N 20/00
11,501,190 B2 *   11/2022  Jadon .................. G06N 20/00
(Continued)

OTHER PUBLICATIONS

Usachev et al., "Software Package For Improving Financial And Technological Performance Of Microgrid Networks," 2019 2nd International Youth Scientific and Technical Conference on Relay Protection and Automation (RPA), 2019, pp. 1-9 (Year: 2019).*
(Continued)

*Primary Examiner* — Chesiree A Walton
(74) *Attorney, Agent, or Firm* — Harrity & Harrity, LLP

(57) ABSTRACT

A device may receive network data, business data, and user configuration data associated with an entity that is a candidate for a private network and may process the business data and the user configuration data, with a classification machine learning model, to determine a network hardware equipment prediction. The device may process the network data and the business data, with a first linear regression machine learning model, to determine a business output prediction and may utilize a second linear regression machine learning model to determine a data consumption prediction based on the network hardware equipment prediction. The device may process the network hardware equipment prediction, the business output prediction, and the data consumption prediction, with a machine learning model, to determine a financial profitability prediction for the private network and may perform one or more actions based on the financial profitability prediction.

20 Claims, 11 Drawing Sheets

(51) Int. Cl.
*G06N 20/00* (2019.01)
*H04L 41/14* (2022.01)
*H04L 41/147* (2022.01)

(56) References Cited

U.S. PATENT DOCUMENTS

| | | | | |
|---|---|---|---|---|
| 2019/0155712 A1* | 5/2019 | Tiwari | ............ | G06N 5/00 |
| 2020/0134423 A1* | 4/2020 | Shinde | ............ | G06F 21/53 |
| 2020/0286104 A1* | 9/2020 | Smith | ............ | G06F 17/18 |
| 2021/0397941 A1* | 12/2021 | Zhu | ............ | G06Q 10/06 |

OTHER PUBLICATIONS

Lederrey et al., "Estimation of Discrete Choice Models with Hybrid Stochastic Adaptive Batch Size Algorithms", Report TRANSP-OR 191213 Transport and Mobility Laboratory School of Architecture, Civil and Environmental Engineering, Dec. 23, 2020 (Year: 2020).*
Pai et al., "A Comparative Study on Machine Learning Techniques in Assessment of Financial Portfolios," 2020 5th International Conference on Communication and Electronics Systems (ICCES), 2020, pp. 876-882, (Year: 2020).*
J. Xie et al., "A Survey of Machine Learning Techniques Applied to Software Defined Networking (SDN): Research Issues and Challenges," in IEEE Communications Surveys & Tutorials, vol. 21, No. 1, pp. 393-430, Firstquarter 2019, doi: 10.1109/COMST.2018.2866942. (Year: 2019).*

* cited by examiner

US 11,961,099 B2

UTILIZING MACHINE LEARNING FOR OPTIMIZATION OF PLANNING AND VALUE REALIZATION FOR PRIVATE NETWORKS

BACKGROUND

Entities (e.g., business organizations, government agencies, and/or the like) increasingly require new networking strategies to support enterprise transformation, particularly strategies related to mobile and connectivity options.

SUMMARY

In some implementations, a method includes receiving network data, business data, and user configuration data associated with an entity that is a candidate for a private network and processing the business data and the user configuration data, with a classification machine learning model, to determine a network hardware equipment prediction for the private network. The method may include processing the network data and the business data, with a first linear regression machine learning model, to determine a business output prediction for the private network and utilizing a second linear regression machine learning model to determine a data consumption prediction for the private network based on the network hardware equipment prediction. The method may include processing the network hardware equipment prediction, the business output prediction, and the data consumption prediction, with a machine learning model, to determine a financial profitability prediction for the private network and performing one or more actions based on the financial profitability prediction.

In some implementations, a device includes one or more memories and one or more processors to receive network data, business data, and user configuration data associated with an entity that is a candidate for a private network, wherein the network data includes data identifying network devices and network characteristics associated with one or more networks currently utilized by the entity, wherein the business data includes data identifying costs associated with the one or more networks, and wherein the user configuration data includes data identifying characteristics associated with one or more operations of the entity. The one or more processors may process the business data and the user configuration data, with a classification machine learning model, to determine a network hardware equipment prediction for the private network and may process the network data and the business data, with a first linear regression machine learning model, to determine a business output prediction for the private network. The one or more processors may utilize a second linear regression machine learning model to determine a data consumption prediction for the private network based on the network hardware equipment prediction and may process the network hardware equipment prediction, the business output prediction, and the data consumption prediction, with a machine learning model, to determine a financial profitability prediction for the private network. The one or more processors may perform one or more actions based on the financial profitability prediction.

In some implementations, a non-transitory computer-readable medium may store a set of instructions that includes one or more instructions that, when executed by one or more processors of a device, cause the device to receive network data, business data, and user configuration data associated with an entity that is a candidate for a private network, wherein the private network includes one or more of a fourth-generation network, a fifth-generation network, a citizens broadband radio service network, a cloud computing environment, or an edge cloud environment. The one or more instructions may cause the device to process the business data and the user configuration data, with a classification machine learning model, to determine a network hardware equipment prediction for the private network and process the network data and the business data, with a first linear regression machine learning model, to determine a business output prediction for the private network. The one or more instructions may cause the device to utilize a second linear regression machine learning model to determine a data consumption prediction for the private network based on the network hardware equipment prediction and process the network hardware equipment prediction, the business output prediction, and the data consumption prediction, with a machine learning model, to determine a financial profitability prediction for the private network. The one or more instructions may cause the device to perform one or more actions based on the financial profitability prediction.

DETAILED DESCRIPTION

Figure 1A:
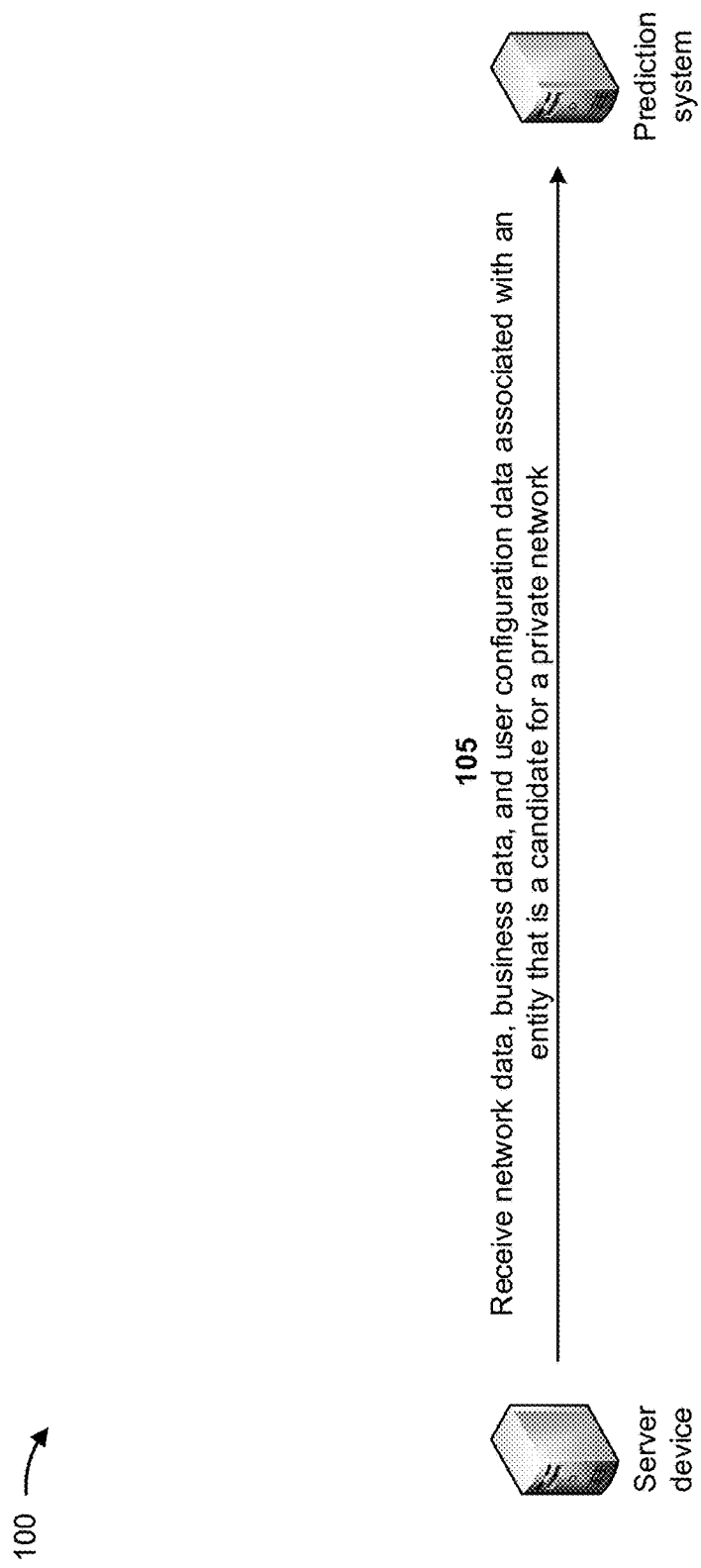
FIGS. 1A-1G are diagrams of an example implementation described herein.

The following detailed description of example implementations refers to the accompanying drawings. The same reference numbers in different drawings may identify the same or similar elements.

A private network (e.g., a private wireless network, such as a fourth generation (4G) network, a fifth generation (5G) network, a citizens broadband radio service (CBRS) network, and/or the like) may be deployed for an entity to provide a form-fitted solution that delivers carrier grade connectivity to an entity associated with large areas of coverage (e.g., a utilities company, a manufacturing company, an oil and gas company, a public sector and logistics company, and/or the like). A private network may provide an entity with a single network to connect multiple users, user devices, Internet of Things (IoT) endpoint devices, and/or the like, whether mobile or fixed and across large coverage areas and distances.

However, current techniques for determining whether to deploy a private network requires an entity to commit significant human and computing resources for retrieving data from various sources of the entity, analyzing the data, and deciding whether to deploy the private network. Thus, current techniques for determining whether to deploy a private network waste computing resources (e.g., processing resources, memory resources, communication resources, and/or the like), networking resources, human resources, and/or the like associated with retrieving insufficient or incorrect data from various sources of the entity, incorrectly analyzing the insufficient or incorrect data, making an incorrect decision whether to deploy the private network based on incorrectly analyzing the insufficient or incorrect data, and/or the like.

Some implementations described herein relate to a prediction system that utilizes machine learning models to assist deployment of a private network. For example, the prediction system may receive network data, business data, and user configuration data associated with an entity that is a candidate for a private network and may process the business data and the user configuration data, with a classification machine learning model, to determine a network hardware equipment prediction for the private network. The prediction system may process the network data and the business data, with a first linear regression machine learning model, to determine a business output prediction for the private network and may utilize a second linear regression machine learning model to determine a data consumption prediction for the private network based on the network hardware equipment prediction. The prediction system may process the network hardware equipment prediction, the business output prediction, and the data consumption prediction, with a machine learning model, to determine a financial profitability prediction for the private network and may perform one or more actions based on the financial profitability prediction.

In this way, the prediction system utilizes machine learning models to assist deployment of a private network. The prediction system provides a high level of flexibility through which inputs to the prediction system may be tailored to entities of various industries. The prediction system may provide a customizable business model calculation that evaluates a financial impact of investing in a private network by an entity. The prediction system may increase a speed and an accuracy associated with an investment decision for a private network. This, in turn, conserves computing resources, networking resources, human resources, and/or the like that would otherwise have been wasted in retrieving insufficient or incorrect data from various sources of the entity, incorrectly analyzing the insufficient or incorrect data, making an incorrect decision whether to deploy the private network based on incorrectly analyzing the insufficient or incorrect data, and/or the like.

FIGS. 1A-1G are diagrams of an example 100 associated with utilizing machine learning models to assist deployment of a private network. As shown in FIGS. 1A-1G, example 100 includes a server device associated with a prediction system. The server device and the prediction system are described in greater detail below.

As shown in FIG. 1A, and by reference number 105, the prediction system may receive network data, business data, and user configuration data associated with an entity that is a candidate for a private network. For example, the prediction system may receive the network data, the business data, and the user configuration data from a server device associated with the entity, from a data store associated with the entity, from a network associated with the entity, and/or the like. The entity may include a business organization, a government agency, and/or the like. The private network may include one or more of a 4G network, a 5G network, a CBRS network, a cloud computing environment, an edge cloud environment, and/or the like.

The network data may include data identifying network devices and network characteristics associated with one or more networks currently utilized by the entity. For example, the network data may include data identifying radio access networks (RANs), cell towers, mobile devices, Internet of Things (IoT) devices, edge devices, automation devices, digital operation devices, surveillance devices, global positioning system (GPS) devices, traffic throughput, and/or the like associated with the one or more networks currently utilized by the entity.

The business data may include data identifying costs associated with the one or more networks. For example, the business data may include data identifying costs of operating the RANs, the cell towers, the mobile devices, the IoT devices, the edge devices, the automation devices, the digital operation devices, the surveillance devices, the GPS devices, and/or the like associated with the one or more networks.

The user configuration data may include data identifying characteristics associated with one or more operations of the entity. For example, the user configuration data may include data identifying square miles of real estate occupied by the entity for the one or more operations, a quantity of facilities associated with the one or more operations (e.g., rigs, wells, tanks, barrels, and/or the like), a profit associated with each of the facilities, and/or the like. In some implementations, the prediction system may store the network data, the business data, and/or the user configuration data in a data structure associated with the prediction system.

Figure 1B:
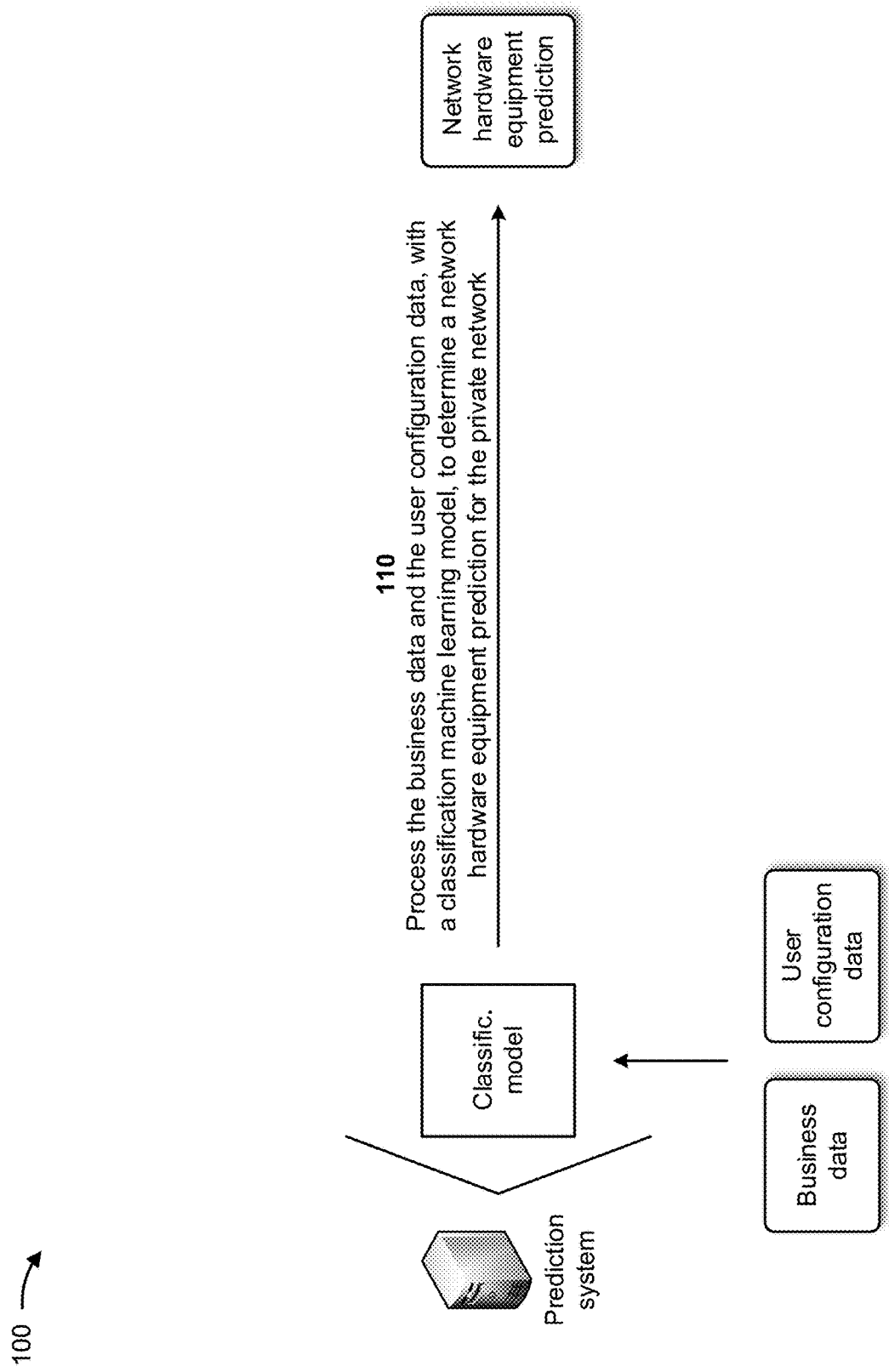

As shown in FIG. 1B, and by reference number 110, the prediction system may process the business data and the user configuration data, with a classification machine learning model, to determine a network hardware equipment prediction for the private network. The prediction system may train the classification machine learning model in a manner similar to the manner described below in connection with FIG. 2. The network hardware equipment prediction may include a prediction of network hardware equipment to deploy for the private network. For example, the network hardware equipment prediction may include a prediction of quantities of gateways, mobile devices, drones, subscriber identity module (SIM) cards, RANs, edge zones, edge connectors, tablets, video camera, cell towers, and/or the like to deploy for the private network; a prediction of a quantity of network hardware equipment provided on premises for the entity; a prediction of a quantity of network hardware equipment provided off premises for the entity; and/or the like.

In some implementations, the classification machine learning model may classify the business data and the user configuration data into network hardware equipment classes and may predict the network hardware equipment to deploy for the private network based on the network hardware equipment classes.

Figure 1C:
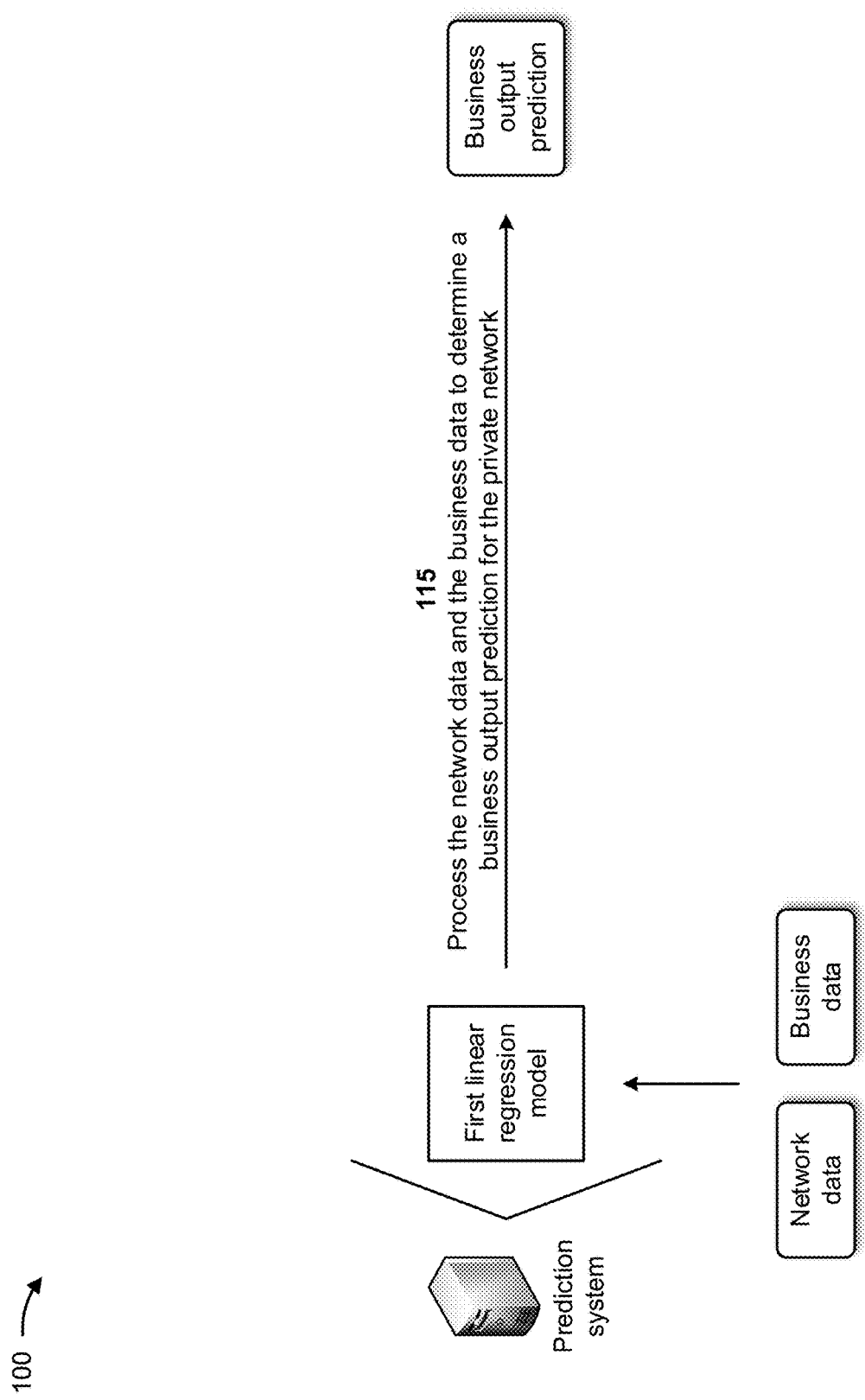

As shown in FIG. 1C, and by reference number 115, the prediction system may process the network data and the business data, with a first linear regression machine learning model, to determine a business output prediction for the private network. The prediction system may train the first linear regression machine learning model in a manner similar to the manner described below in connection with FIG. 2. The business output prediction may include a prediction of expected revenue growth and production growth for the entity based on deployment of the private network. For example, the business output prediction may include a prediction of data savings associated with the private network for the entity, a prediction of capital expenditures associated with the private network for the entity, a prediction of operational expenditures associated with the private network for the entity, a prediction of value added (e.g., revenue growth and production growth) by the private network for the entity, and/or the like.

In some implementations, the first linear regression machine learning model may predict network hardware equipment growth for the private network based on the network data and the business data. The first linear regression model may then predict the revenue growth and the production growth for the entity based on the network hardware equipment growth.

Figure 1D:
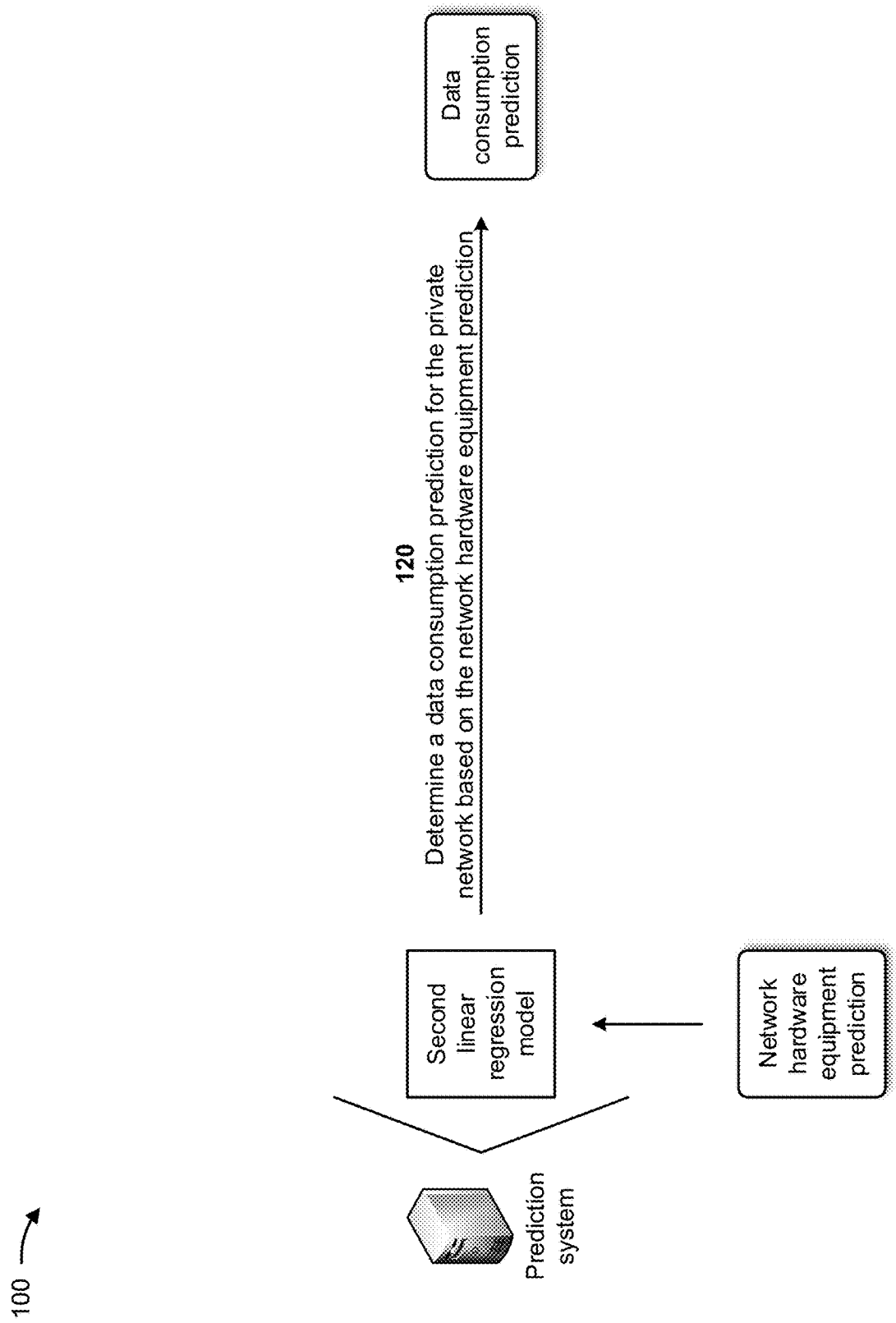

As shown in FIG. 1D, and by reference number 120, the prediction system may utilize a second linear regression machine learning model to determine a data consumption prediction for the private network based on the network hardware equipment prediction. The prediction system may train the second linear regression machine learning model in a manner similar to the manner described below in connection with FIG. 2. The data consumption prediction may include a prediction of data consumption by the entity based on deployment of the private network. For example, the data consumption prediction may include a prediction of a traffic demand for the private network, a breakout of the predicted traffic demand for the private network, and/or the like.

In some implementations, the second linear regression machine learning model may predict, based on the network hardware equipment prediction, a data consumption by the entity to enable one or more use cases for deployment of the private network. For example, the second linear regression machine learning model may determine different configurations of the network hardware equipment for the private network based on the network hardware equipment prediction and may determine the one or more use cases (e.g., identifying different data consumption predictions) for deployment of the private network based on the different configurations of the network hardware equipment.

Figure 1E:
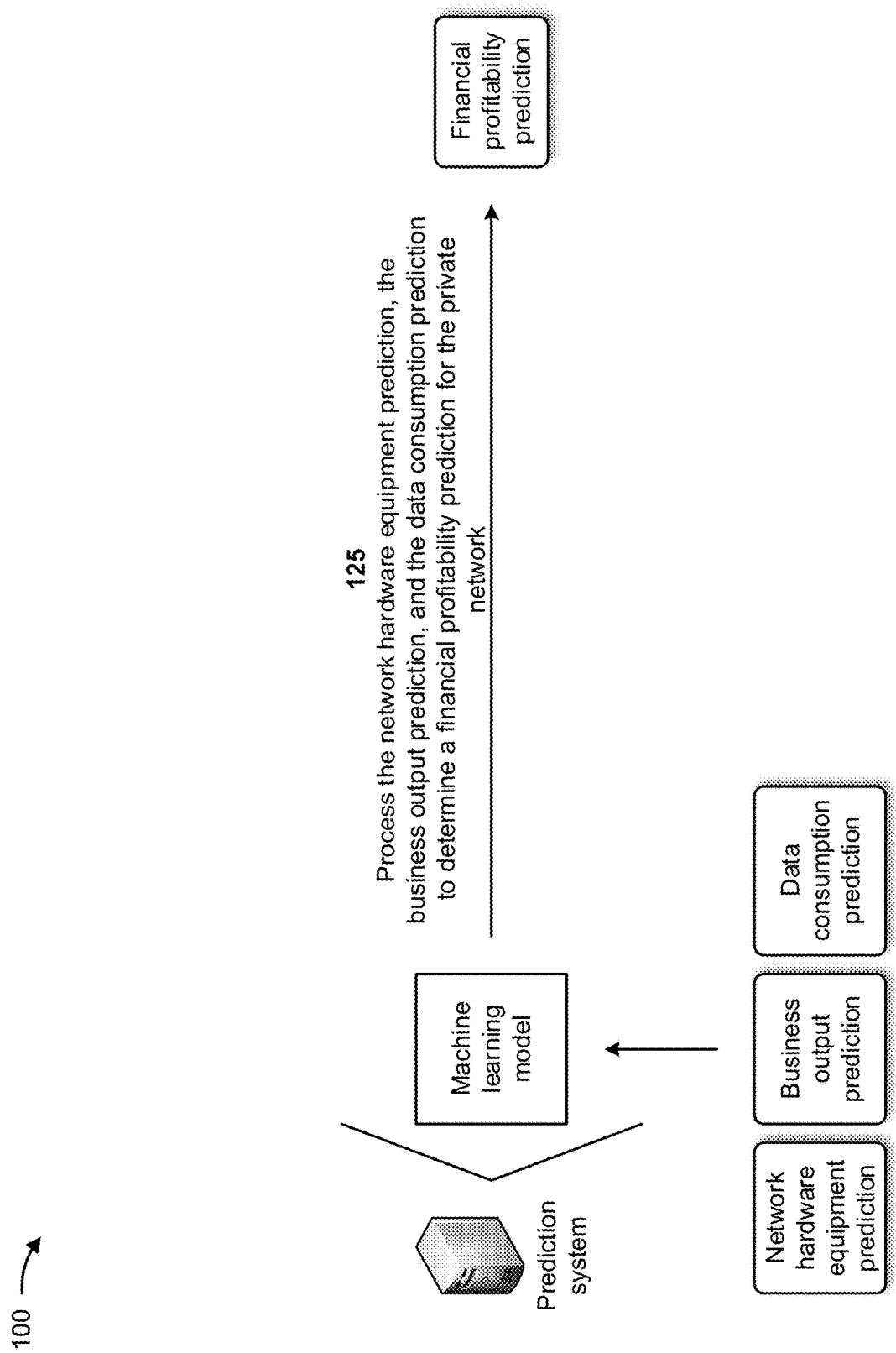

As shown in FIG. 1E, and by reference number 125, the prediction system may process the network hardware equipment prediction, the business output prediction, and the data consumption prediction, with a machine learning model, to determine a financial profitability prediction for the private network. The machine learning model may include a first order adaptive moment estimation model and a second order quasi-Newton model. The prediction system may train the machine learning model in a manner similar to the manner described below in connection with FIG. 2. The financial profitability prediction may include a prediction of a financial profitability for the entity based on deployment of the private network. For example, the financial profitability prediction may include a prediction that maximizes immediate savings for the entity based on deployment of the private network, a prediction that maximizes an immediate return on investment for the entity based on deployment of the private network, a prediction that minimizes capital expenditures for the entity based on deployment of the private network, a prediction that minimizes operational expenditures for the entity based on deployment of the private network, a prediction of a cashflow summary for the entity based on deployment of the private network, a prediction of a cumulative cashflow for the entity based on deployment of the private network, a prediction of capital expenditures for the entity based on deployment of the private network, a prediction of operational expenditures for the entity based on deployment of the private network, a prediction of a total spent by category by the entity based on deployment of the private network, a prediction of a percent of devices deployed by category based on deployment of the private network, a prediction of a user case return by category for the entity based on deployment of the private network, a prediction of savings versus an efficiency gain for the entity based on deployment of the private network, and/or the like.

In some implementations, the prediction system may simulate a plurality of value case scenarios with first order and second order optimization machine learning models and based on the network hardware equipment prediction, the business output prediction, and the data consumption prediction. The prediction system may select a greatest one of the plurality of value case scenarios (e.g., a scenario with a greatest value to the entity, such as maximize immediate savings, maximize return on inventors, minimize operational expenditures, minimize capital expenditures, and/or the like) as the financial profitability prediction. In some implementations, the prediction system may provide information identifying the plurality of value case scenarios for display to a user of the prediction system and the user may select one of the plurality of value case scenarios as the financial profitability prediction.

Figure 1F:
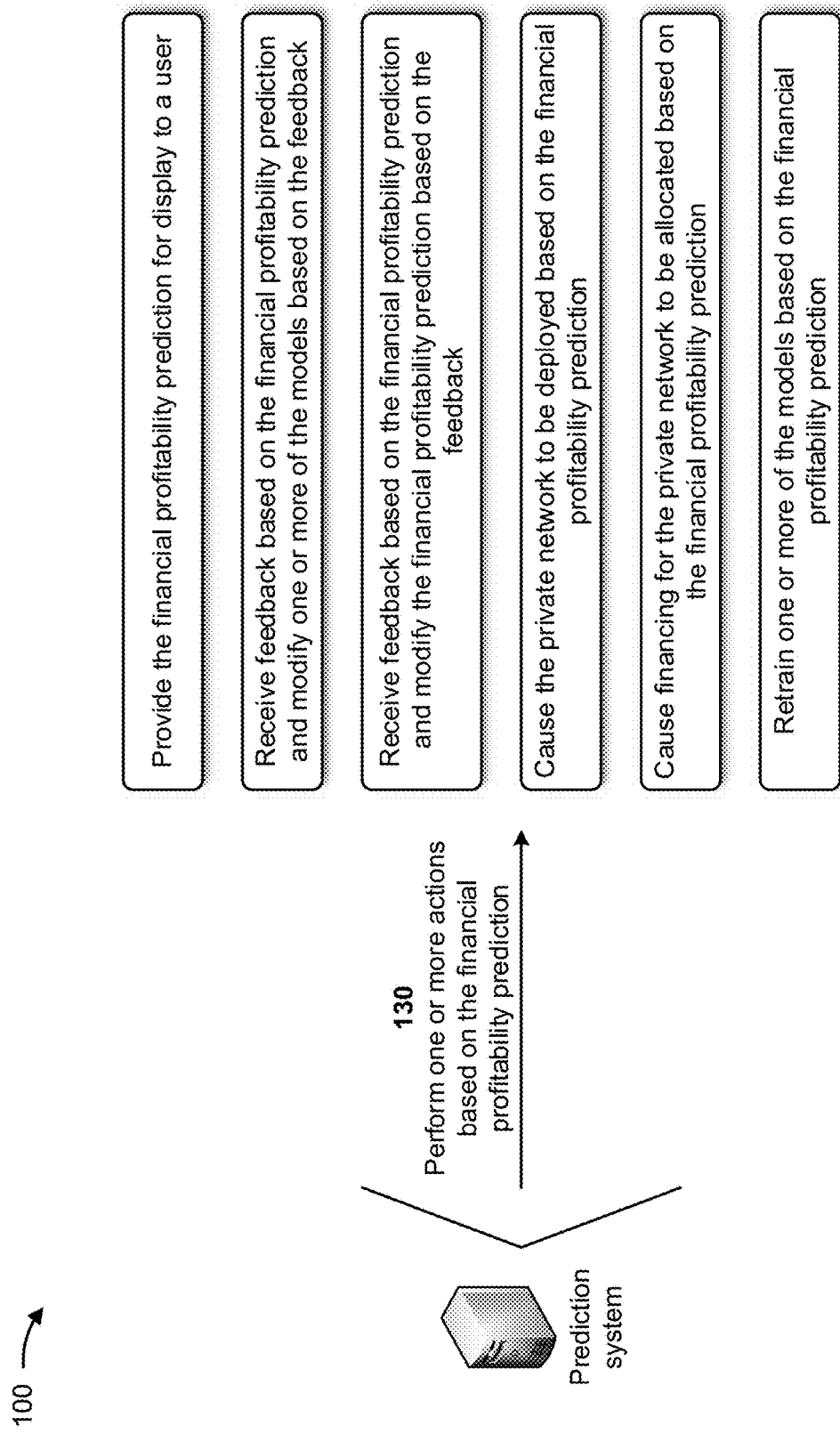

As shown in FIG. 1F, and by reference number 130, the prediction system may perform one or more actions based on the financial profitability prediction. In some implementations, the one or more actions include prediction system providing the financial profitability prediction for display to a user of the prediction system. For example, the prediction system may display the financial profitability prediction to a decision maker of the entity so that the decision maker may approve or reject deployment of the private network for the entity. In this way, the decision maker of the entity may make a correct decision whether to deploy the private network, which may conserve computing resources, networking resources, human resources, and/or the like.

In some implementations, the one or more actions include the prediction system receiving feedback based on the financial profitability prediction and modifying one or more of the classification machine learning model, the first linear regression machine learning model, the second linear regression machine learning model, and/or the machine learning model based on the feedback. The prediction system may utilize the feedback as additional training data for retraining the classification machine learning model, the first linear regression machine learning model, the second linear regression machine learning model, and/or the machine learning model, thereby increasing the quantity of training data available for training the classification machine learning model, the first linear regression machine learning model, the second linear regression machine learning model, and/or the machine learning model. Accordingly, the prediction system may conserve computing resources associated with identifying, obtaining, and/or generating historical data for training the classification machine learning model, the first linear regression machine learning model, the second linear regression machine learning model, and/or the machine learning model relative to other systems for identifying, obtaining, and/or generating historical data for training machine learning models.

In some implementations, the one or more actions include the prediction system receiving feedback based on model outcomes (e.g., the financial profitability prediction is not correct and a provides correction feedback) and modifying the financial profitability prediction based on the feedback (e.g., or retraining the machine learning model based on the feedback). For example, a user of the prediction system may review the financial profitability prediction (e.g., a maximize immediate savings prediction) and may request (e.g., via the feedback) other predictions, such as a maximize immediate return on investment prediction, a minimize capital expenditure prediction, a minimize operational expenditure prediction, and/or the like. The prediction system may modify the financial profitability prediction based on the feedback by providing one or more of the other predictions for display to the user. In this way, the user may make a correct decision whether to deploy the private network, which may conserve computing resources, networking resources, human resources, and/or the like.

In some implementations, the one or more actions include the prediction system causing the private network to be deployed based on the financial profitability prediction. With the permission of the entity, the prediction system may cause the private network to be deployed by ordering the network hardware equipment predicted for the private network, by hiring a service to install the network hardware equipment, and/or the like. In this way, the prediction system may automatically cause the private network to be deployed which may conserve computing resources, networking resources, human resources, and/or the like associated with deploying the private network.

In some implementations, the one or more actions include the prediction system causing financing for the private network to be allocated based on the financial profitability prediction. With the permission of the entity, the prediction system may cause financing for the private network to be allocated by determining costs associated with the network hardware equipment predicted for the private network, by determining costs associated with to installing the network hardware equipment, by contacting a financial institution to procure financing for the determined costs, and/or the like. In this way, the prediction system may automatically cause the private network to be deployed which may conserve computing resources, networking resources, human resources, and/or the like associated with deploying the private network.

In some implementations, the one or more actions include the prediction system retraining the classification machine learning model, the first linear regression machine learning model, the second linear regression machine learning model, and/or the machine learning model based on the financial profitability prediction. The prediction system may utilize the financial profitability prediction as additional training data for retraining the classification machine learning model, the first linear regression machine learning model, the second linear regression machine learning model, and/or the machine learning model, thereby increasing the quantity of training data available for training the classification machine learning model, the first linear regression machine learning model, the second linear regression machine learning model, and/or the machine learning model. Accordingly, the prediction system may conserve computing resources associated with identifying, obtaining, and/or generating historical data for training the classification machine learning model, the first linear regression machine learning model, the second linear regression machine learning model, and/or the machine learning model relative to other systems for identifying, obtaining, and/or generating historical data for training machine learning models.

Figure 1G:
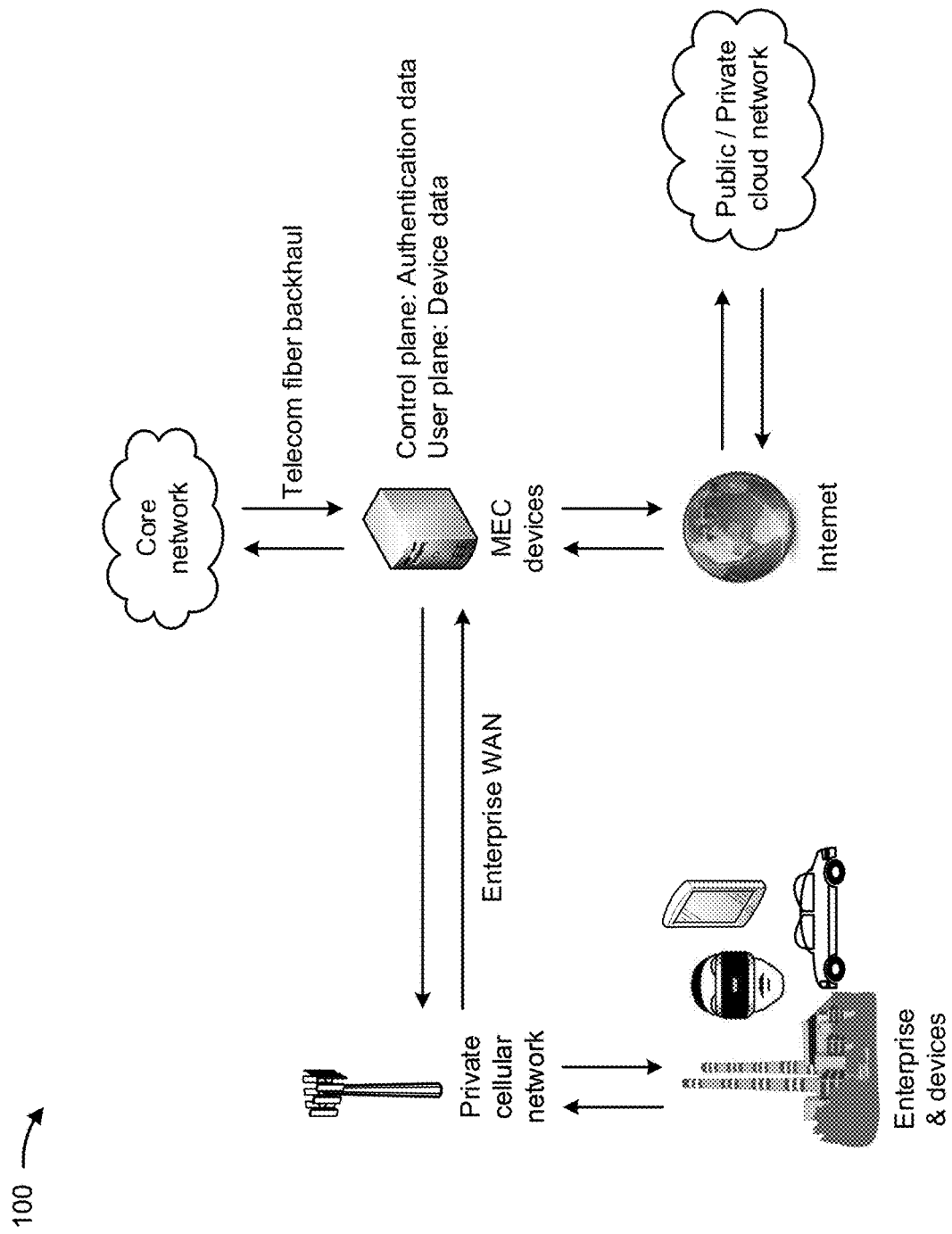

FIG. 1G provides an example private network configuration that may be deployed for the entity (e.g., based on the financial profitability prediction). As shown, the private network configuration may include an enterprise and devices associated with the entity, such as a manufacturing facility, an office facility, IoT sensors, mobile devices, cameras, and/or the like connected to a network of the entity. The enterprises and devices may communicate with a private cellular network (e.g., a 4G or a 5G private cellular network) that includes an infrastructure and a spectrum (e.g., licenses, unlicensed, shared, and/or the like). The private cellular network may communicate with (e.g., via an enterprise WAN) multi-access edge computing (MEC) devices that provide local traffic breakout, provide a hybrid or a full core network, handle machine learning model or artificial intelligence model workloads (e.g., IoT device data, software-defined networking in a wide area network (SD-WAN) data, virtual network function (VNF) data, cloud native network function (CNF) data, big data, and/or the like).

The MEC devices may communicate (e.g., via a telecommunication fiber backhaul) with a core network that may include a 4G or a 5G core network, an operations support systems (OSS), subscriber identity module (SIM) management, voice services, and/or the like. The MEC devices may also communicate, via the Internet, with a public or a private cloud network that may include an IoT platform, device management, containers, a cloud data platform, and/or the like.

In this way, the prediction system utilizes machine learning models to assist deployment of a private network. The prediction system provides a high level of flexibility through which inputs to the prediction system may be tailored to entities of various industries. The prediction system may provide a customizable business model calculation that evaluates a financial impact of investing in a private network by an entity. The prediction system may increase a speed and an accuracy associated with an investment decision for a private network. This, in turn, conserves computing resources, networking resources, human resources, and/or the like that would otherwise have been wasted in retrieving insufficient or incorrect data from various sources of the entity, incorrectly analyzing the insufficient or incorrect data, making an incorrect decision whether to deploy the private network based on incorrectly analyzing the insufficient or incorrect data, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
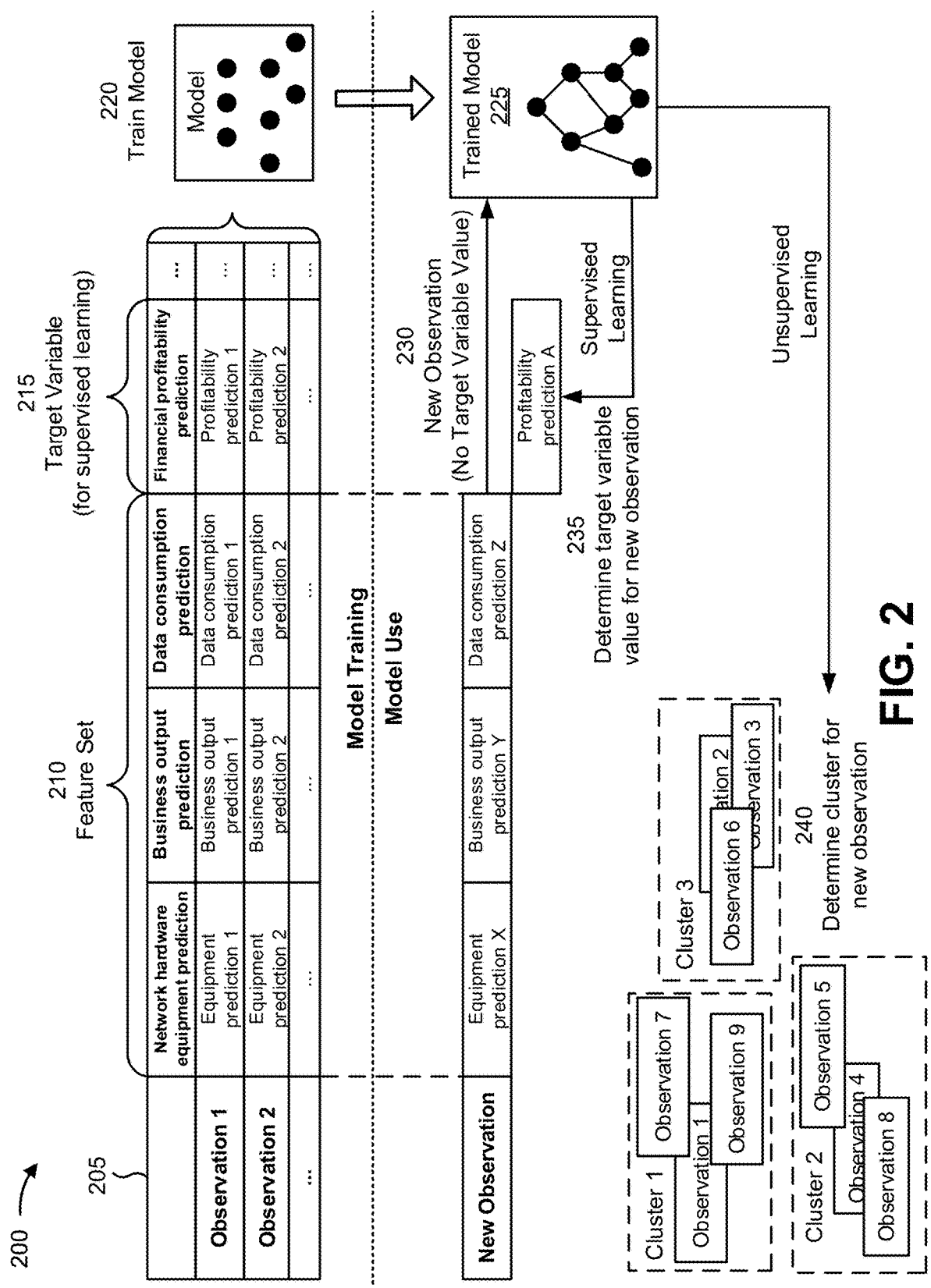
FIG. 2 is a diagram illustrating an example of training and using a machine learning model in connection with assisting deployment of a private network.

FIG. 2 is a diagram illustrating an example 200 of training and using a machine learning model in connection with assisting deployment of a private network. The machine learning model training and usage described herein may be performed using a machine learning system. The machine learning system may include or may be included in a computing device, a server, a cloud computing environment, and/or the like, such as the prediction system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system. For example, the machine learning system may identify a feature set (e.g., one or more features and/or feature values) by extracting the feature set from structured data, by using k-means clustering to extract feature set from unstructured data, by receiving input from an operator, and/or the like.

As an example, a feature set for a set of observations may include a first feature of a network hardware equipment prediction, a second feature of a business output prediction, a third feature of a data consumption prediction, and so on. As shown, for a first observation, the first feature may have a value of equipment prediction 1, the second feature may have a value of business output prediction 1, the third feature may have a value of data consumption prediction 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a financially profitability prediction, which has a value of profitability prediction 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of equipment prediction X, a second feature of business output prediction Y, a third feature of data consumption prediction Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict profitability prediction A for the target variable of the cluster for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a network hardware equipment prediction cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a business output prediction cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process for assisting deployment of private network. The machine learning system enables recognition and/or identification of tens, hundreds, thousands, or millions of features and/or feature values for tens, hundreds, thousands, or millions of observations, thereby increasing accuracy and consistency and reducing delay associated with assisting deployment of a private network relative to requiring computing resources to be allocated for tens, hundreds, or thousands of operators to manually assist deployment of private network.

As indicated above, FIG. 2 is provided as an example. Other examples may differ from what is described in connection with FIG. 2.

Figure 3:
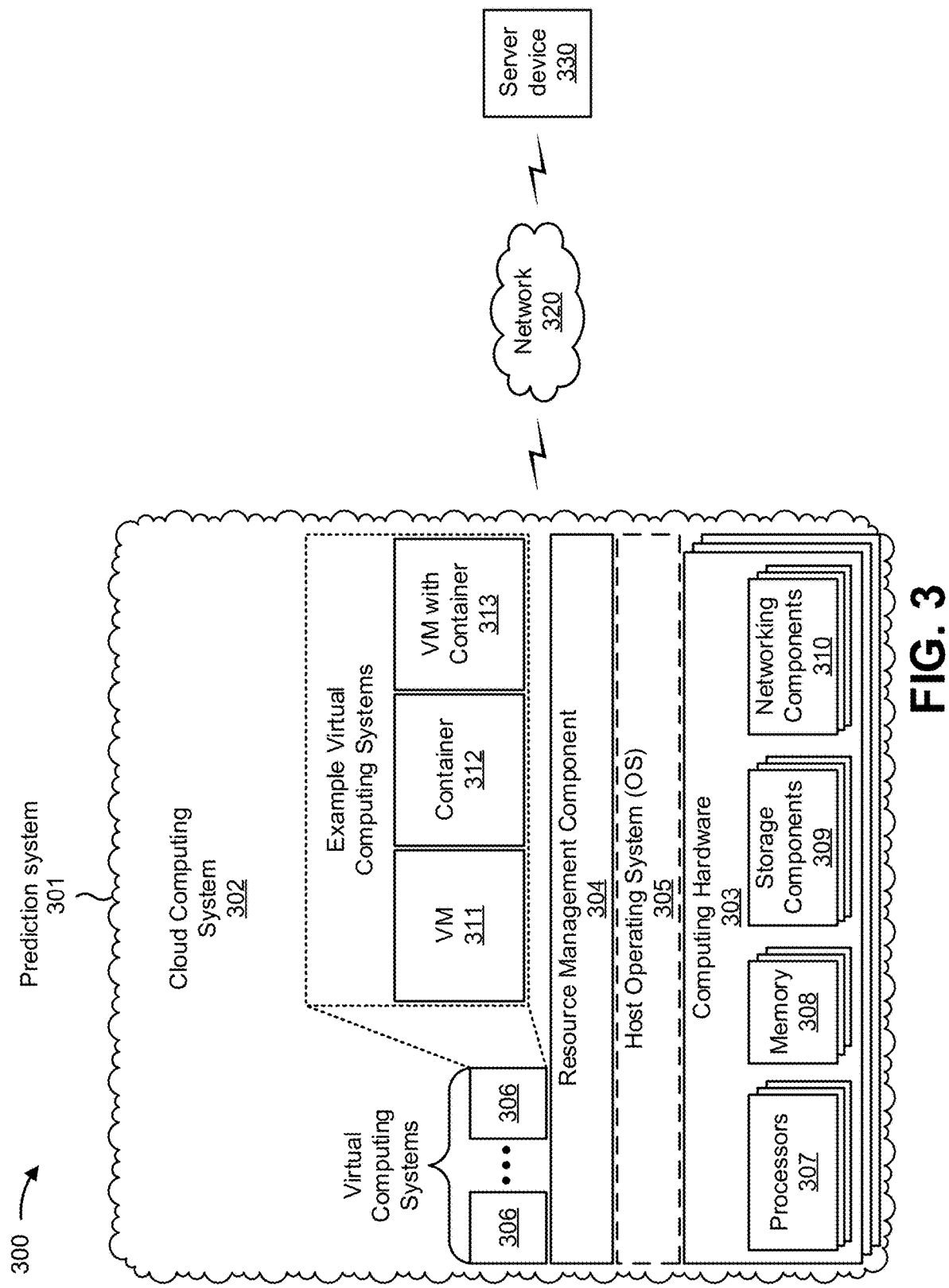
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 301, which may include one or more elements of and/or may execute within a cloud computing system 302. The cloud computing system 302 may include one or more elements 303-313, as described in more detail below. As further shown in FIG. 3, environment 300 may include a network 320 and/or a server device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the prediction system 301 may include one or more elements 303-313 of the cloud computing system 302, may execute within the cloud computing system 302, and/or may be hosted within the cloud computing system 302, in some implementations, the prediction system 301 may not be cloud-based (e.g., may be implemented outside of a cloud computing system) or may be partially cloud-based. For example, the prediction system 301 may include one or more devices that are not part of the cloud computing system 302, such as device 400 of FIG. 4, which may include a standalone server or another type of computing device. The prediction system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Server device 330 includes one or more devices capable of receiving, generating, storing, processing, providing, and/or routing information, as described elsewhere herein. Server device 330 may include a communication device and/or a computing device. For example, server device 330 may include a server, such as an application server, a client server, a web server, a database server, a host server, a proxy server, a virtual server (e.g., executing on computing hardware), or a server in a cloud computing system. In some implementations, server device 330 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
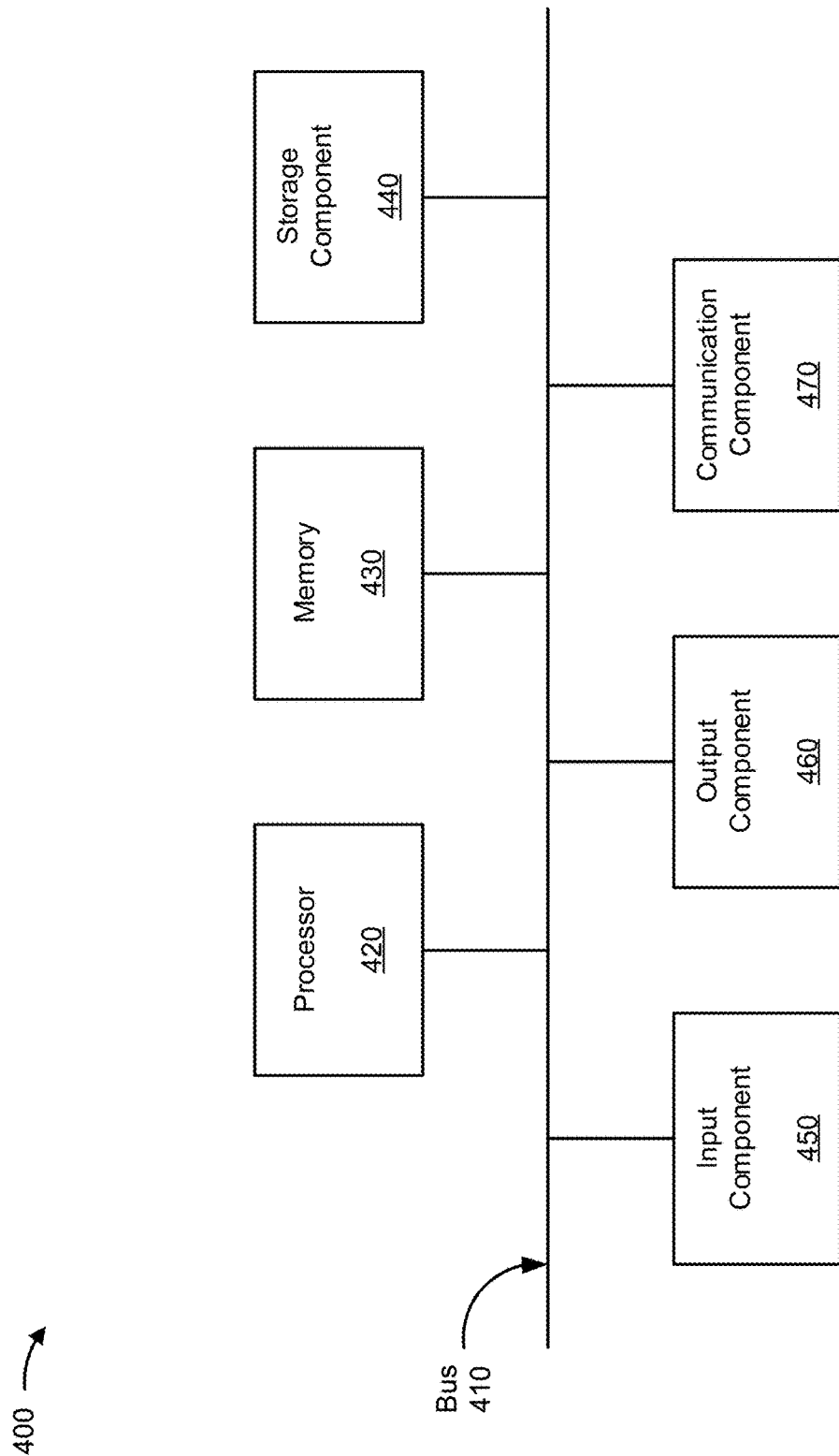
FIG. 4 is a diagram of example components of one or more devices of FIG. 3.

FIG. 4 is a diagram of example components of a device 400, which may correspond to prediction system 301 and/or server device 330. In some implementations, prediction system 301 and/or server device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
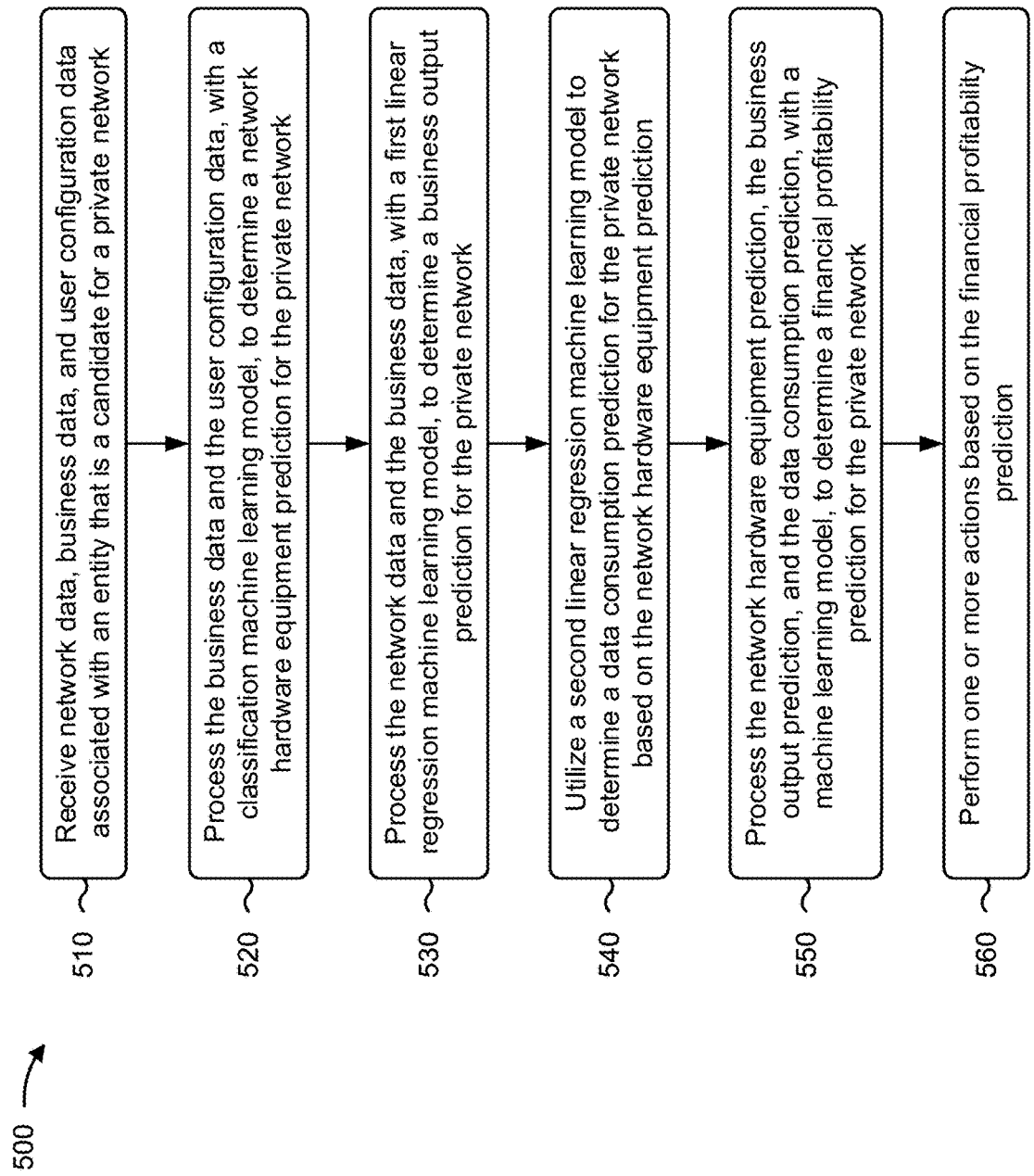
FIG. 5 is a flowchart of an example process for utilizing machine learning models to assist deployment of a private network.

FIG. 5 is a flowchart of an example process 500 for utilizing machine learning models to assist deployment of a private network. In some implementations, one or more process blocks of FIG. 5 may be performed by a device (e.g., prediction system 301). In some implementations, one or more process blocks of FIG. 5 may be performed by another device or a group of devices separate from or including the device, such as a server device (e.g., server device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving network data, business data, and user configuration data associated with an entity that is a candidate for a private network (block 510). For example, the device may receive network data, business data, and user configuration data associated with an entity that is a candidate for a private network, as described above.

As further shown in FIG. 5, process 500 may include processing the business data and the user configuration data, with a classification machine learning model, to determine a network hardware equipment prediction for the private network (block 520). For example, the device may process the business data and the user configuration data, with a classification machine learning model, to determine a network hardware equipment prediction for the private network, as described above.

As further shown in FIG. 5, process 500 may include processing the network data and the business data, with a first linear regression machine learning model, to determine a business output prediction for the private network (block 530). For example, the device may process the network data and the business data, with a first linear regression machine learning model, to determine a business output prediction for the private network, as described above.

As further shown in FIG. 5, process 500 may include utilizing a second linear regression machine learning model to determine a data consumption prediction for the private network based on the network hardware equipment prediction (block 540). For example, the device may utilize a second linear regression machine learning model to determine a data consumption prediction for the private network based on the network hardware equipment prediction, as described above.

As further shown in FIG. 5, process 500 may include processing the network hardware equipment prediction, the business output prediction, and the data consumption prediction, with a machine learning model, to determine a financial profitability prediction for the private network (block 550). For example, the device may process the network hardware equipment prediction, the business output prediction, and the data consumption prediction, with a machine learning model, to determine a financial profitability prediction for the private network, as described above.

As further shown in FIG. 5, process 500 may include performing one or more actions based on the financial profitability prediction (block 560). For example, the device may perform one or more actions based on the financial profitability prediction, as described above.

Process 500 may include additional implementations, such as any single implementation or any combination of implementations described below and/or in connection with one or more other processes described elsewhere herein.

In a first implementation, the network data includes data identifying network devices and network characteristics associated with one or more networks currently utilized by the entity, the business data includes data identifying costs associated with the one or more networks, and the user configuration data includes data identifying characteristics associated with one or more operations of the entity.

In a second implementation, alone or in combination with the first implementation, the private network includes one or more of a fourth-generation network, a fifth-generation network, a citizens broadband radio service network, a cloud computing environment, an edge cloud environment, a Wi-Fi network, a narrowband Internet of Things network, a campus and venue Wi-Fi network, a wireless point-to-multipoint network, a microwave point-to-point network, a fixed wireless access network, a fixed wireless local loop network, a third-generation network, a satellite communication network, a tactical wireless network, a wireless on wheels network, a consumer wireless network, a vehicle-to-vehicle communication network, or a push-to-talk network.

In a third implementation, alone or in combination with one or more of the first and second implementations, the network hardware equipment includes a prediction of network hardware equipment to deploy for the private network, the business output prediction includes a prediction of expected revenue growth and production growth for the entity based on deployment of the private network, the data consumption prediction includes a prediction of data consumption by the entity based on deployment of the private network, and the financial profitability prediction includes a prediction of a financial profitability for the entity based on deployment of the private network.

In a fourth implementation, alone or in combination with one or more of the first through third implementations, the machine learning model includes a first order adaptive moment estimation model and a second order quasi-Newton model.

In a fifth implementation, alone or in combination with one or more of the first through fourth implementations, processing the business data and the user configuration data, with the classification machine learning model, to determine the network hardware equipment prediction includes predicting network hardware equipment for the private network based on the business data and the user configuration data.

In a sixth implementation, alone or in combination with one or more of the first through fifth implementations, processing the network data and the business data, with the first linear regression machine learning model, to determine the business output prediction includes predicting network hardware equipment growth for the private network, and predicting revenue growth and production growth for the entity based on the network hardware equipment growth.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In a seventh implementation, alone or in combination with one or more of the first through sixth implementations, utilizing the second linear regression machine learning model to determine the data consumption prediction includes predicting data consumption by the entity to enable one or more use cases for deployment of the private network.

In an eighth implementation, alone or in combination with one or more of the first through seventh implementations, processing the network hardware equipment prediction, the business output prediction, and the data consumption prediction, with the machine learning model, to determine the financial profitability prediction includes simulating a plurality of value case scenarios with first order and second order optimization machine learning models, and selecting a greatest one of the plurality of value case scenarios as the financial profitability prediction.

In a ninth implementation, alone or in combination with one or more of the first through eighth implementations, performing the one or more actions includes one or more of providing the financial profitability prediction for display to a user; causing the private network to be deployed based on the financial profitability prediction; causing financing for the private network to be allocated based on the financial profitability prediction; or retraining one or more of the classification machine learning model, the first linear regression machine learning model, the second linear regression machine learning model, or the machine learning model based on the financial profitability prediction.

In a tenth implementation, alone or in combination with one or more of the first through ninth implementations, performing the one or more actions includes receiving feedback based on the financial profitability prediction, and modifying one or more of the classification machine learning model, the first linear regression machine learning model, the second linear regression machine learning model, or the machine learning model based on the feedback.

In an eleventh implementation, alone or in combination with one or more of the first through tenth implementations, performing the one or more actions includes receiving feedback based on the financial profitability prediction, and modifying the financial profitability prediction based on the feedback.

In a twelfth implementation, alone or in combination with one or more of the first through eleventh implementations, performing the one or more actions includes causing financing for the private network to be allocated based on the financial profitability prediction, and causing the private network to be deployed based on causing financing for the private network to be allocated.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, network data, business data, and user configuration data associated with an entity that is a candidate for a private network;
    training a classification machine learning model, a first linear regression machine learning model, a second linear regression machine learning model, and an observation machine learning model based on observations;
    processing, by the device, the business data and the user configuration data, with the classification machine learning model, to determine a network hardware equipment prediction for the private network;
    processing, by the device, the network data and the business data, with the first linear regression machine learning model, to determine a business output prediction for the private network,
        wherein the business output prediction includes one or more of:
            a prediction of capital expenditures associated with the private network, or
            a prediction of operational expenditures associated with the private network;
    utilizing, by the device, the second linear regression machine learning model to determine a data consumption prediction for the private network based on the network hardware equipment prediction;
    processing, by the device, the network hardware equipment prediction, the business output prediction, and the data consumption prediction, with the observation machine learning model, to determine a financial profitability prediction for the entity based on deployment of the private network; and
    performing, by the device, one or more actions based on the financial profitability prediction;
        wherein performing the one or more actions comprises:
            receiving, by the device, feedback based on the financial profitability prediction; and
            retraining, by the device and utilizing the feedback as additional training data, one or more of the classification machine learning model, the first linear regression machine learning model, the second linear regression machine learning model, or the observation machine learning model based on the financial profitability prediction.

2. The method of claim 1, wherein the network data includes data identifying network devices and network characteristics associated with one or more networks currently utilized by the entity,
    wherein the business data includes data identifying costs associated with the one or more networks, and
    wherein the user configuration data includes data identifying characteristics associated with one or more operations of the entity.

3. The method of claim 1, wherein the private network includes one or more of:

a fourth-generation network,
a fifth-generation network,
a citizens broadband radio service network,
a cloud computing environment,
an edge cloud environment,
a Wi-Fi network,
a narrowband Internet of Things network,
a campus and venue Wi-Fi network,
a wireless point-to-multipoint network,
a microwave point-to-point network,
a fixed wireless access network,
a fixed wireless local loop network,
a third-generation network,
a satellite communication network,
a tactical wireless network,
a wireless on wheels network,
a consumer wireless network,
a vehicle-to-vehicle communication network, or
a push-to-talk network.

4. The method of claim 1, wherein the network hardware equipment prediction includes a prediction of network hardware equipment to deploy for the private network,
    wherein the business output prediction includes a prediction of expected revenue growth and production growth for the entity based on deployment of the private network,
    wherein the data consumption prediction includes a prediction of data consumption by the entity based on deployment of the private network.

5. The method of claim 1, wherein the observation machine learning model includes a first order adaptive moment estimation model and a second order quasi-Newton model.

6. The method of claim 1, wherein processing the business data and the user configuration data, with the classification machine learning model, to determine the network hardware equipment prediction comprises:
    predicting network hardware equipment for the private network based on the business data and the user configuration data.

7. The method of claim 1, wherein processing the network data and the business data, with the first linear regression machine learning model, to determine the business output prediction comprises:
    predicting network hardware equipment growth for the private network; and
    predicting revenue growth and production growth for the entity based on the network hardware equipment growth.

8. A device, comprising:
one or more memories; and
one or more processors, coupled to the one or more memories, configured to:
    receive network data, business data, and user configuration data associated with an entity that is a candidate for a private network,
        wherein the network data includes data identifying network devices and network characteristics associated with one or more networks currently utilized by the entity,
        wherein the business data includes data identifying costs associated with the one or more networks, and
        wherein the user configuration data includes data identifying characteristics associated with one or more operations of the entity;

train a classification machine learning model, a first linear regression machine learning model, a second linear regression machine learning model, and an observation machine learning model based on observations;

process the business data and the user configuration data, with the classification machine learning model, to determine a network hardware equipment prediction for the private network;

process the network data and the business data, with the first linear regression machine learning model, to determine a business output prediction for the private network,
wherein the business output prediction includes one or more of:
a prediction of capital expenditures associated with the private network, or
a prediction of operational expenditures associated with the private network;

utilize the second linear regression machine learning model to determine a data consumption prediction for the private network based on the network hardware equipment prediction;

process the network hardware equipment prediction, the business output prediction, and the data consumption prediction, with the observation machine learning model, to determine a financial profitability prediction for the entity based on deployment of the private network; and perform one or more actions based on the financial profitability prediction,
wherein the one or more processors, when performing the one or more actions, are to:
receive feedback based on the financial profitability prediction; and
retrain, utilizing the feedback as additional training data, one or more of the classification machine learning model, the first linear regression machine learning model, the second linear regression machine learning model, or the observation machine learning model based on the financial profitability prediction.

9. The device of claim 8, wherein the one or more processors, to utilize the second linear regression machine learning model to determine the data consumption prediction, are configured to:
predict data consumption by the entity to enable one or more use cases for deployment of the private network.

10. The device of claim 8, wherein the one or more processors, to process the network hardware equipment prediction, the business output prediction, and the data consumption prediction, with the observation machine learning model, to determine the financial profitability prediction, are configured to:
simulate a plurality of value case scenarios with first order and second order optimization machine learning models; and
select a greatest one of the plurality of value case scenarios as the financial profitability prediction.

11. The device of claim 8, wherein the one or more processors, to perform the one or more actions, are configured to one or more of:
provide the financial profitability prediction for display to a user;
cause the private network to be deployed based on the financial profitability prediction; or
cause financing for the private network to be allocated based on the financial profitability prediction.

12. The device of claim 8, wherein the one or more processors, to perform the one or more actions, are configured to:
modify one or more of the classification machine learning model, the first linear regression machine learning model, the second linear regression machine learning model, or the observation machine learning model based on the feedback.

13. The device of claim 8, wherein the one or more processors, to perform the one or more actions, are configured to:
modify the financial profitability prediction based on the feedback.

14. The device of claim 8, wherein the one or more processors, to perform the one or more actions, are configured to:
cause financing for the private network to be allocated based on the financial profitability prediction; and
cause the private network to be deployed based on causing financing for the private network to be allocated.

15. A non-transitory computer-readable medium storing a set of instructions, the set of instructions comprising:
one or more instructions that, when executed by one or more processors of a device, cause the device to:
receive network data, business data, and user configuration data associated with an entity that is a candidate for a private network,
wherein the private network includes one or more of:
a fourth-generation network,
a fifth-generation network,
a citizens broadband radio service network,
a cloud computing environment, or
an edge cloud environment;
train two or more of a classification machine learning model, a first linear regression machine learning model, a second linear regression machine learning model, or an observation machine learning model based on observations;
process the business data and the user configuration data, with the classification machine learning model, to determine a network hardware equipment prediction for the private network;
process the network data and the business data, with the first linear regression machine learning model, to determine a business output prediction for the private network,
wherein the business output prediction includes one or more of:
a prediction of capital expenditures associated with the private network, or
a prediction of operational expenditures associated with the private network;
utilize the second linear regression machine learning model to determine a data consumption prediction for the private network based on the network hardware equipment prediction;
process the network hardware equipment prediction, the business output prediction, and the data consumption prediction, with the observation machine learning model, to determine a financial profitability prediction for the entity based on deployment of the private network; and
perform one or more actions based on the financial profitability prediction, wherein the one or more instructions, that cause the device to perform the one or more actions, cause the device to:
   receive feedback based on the financial profitability prediction, and
   retrain, utilizing the feedback as additional training data, one or more of the classification machine learning model, the first linear regression machine learning model, the second linear regression machine learning model, or the observation machine learning model based on the financial profitability prediction.

16. The non-transitory computer-readable medium of claim 15, wherein the one or more instructions, that cause the device to process the business data and the user configuration data, with the classification machine learning model, to determine the network hardware equipment prediction, cause the device to:
   predict network hardware equipment for the private network based on the business data and the user configuration data.

17. The non-transitory computer-readable medium of claim 15, wherein the one or more instructions, that cause the device to process the network data and the business data, with the first linear regression machine learning model, to determine the business output prediction, cause the device to:
   predict network hardware equipment growth for the private network; and
   predict revenue growth and production growth for the entity based on the network hardware equipment growth.

18. The non-transitory computer-readable medium of claim 15, wherein the one or more instructions, that cause the device to utilize the second linear regression machine learning model to determine the data consumption prediction, cause the device to:
   predict data consumption by the entity to enable one or more use cases for deployment of the private network.

19. The non-transitory computer-readable medium of claim 15, wherein the one or more instructions, that cause the device to process the network hardware equipment prediction, the business output prediction, and the data consumption prediction, with the observation machine learning model, to determine the financial profitability prediction, cause the device to:
   simulate a plurality of value case scenarios with first order and second order optimization machine learning models; and
   select a greatest one of the plurality of value case scenarios as the financial profitability prediction.

20. The non-transitory computer-readable medium of claim 15, wherein the one or more instructions, that cause the device to perform the one or more actions, cause the device to one or more of:
   provide the financial profitability prediction for display;
   cause the private network to be deployed based on the financial profitability prediction;
   cause financing for the private network to be allocated based on the financial profitability prediction;
   receive feedback based on the financial profitability prediction and modify one or more of the classification machine learning model, the first linear regression machine learning model, the second linear regression machine learning model, or the observation machine learning model based on the feedback; or
   modify the financial profitability prediction based on the feedback.

* * * * *